(No Model.)
A. C. & W. E. BENDLER.
CARRIAGE TOP WORKER.
No. 527,314. Patented Oct. 9, 1894.
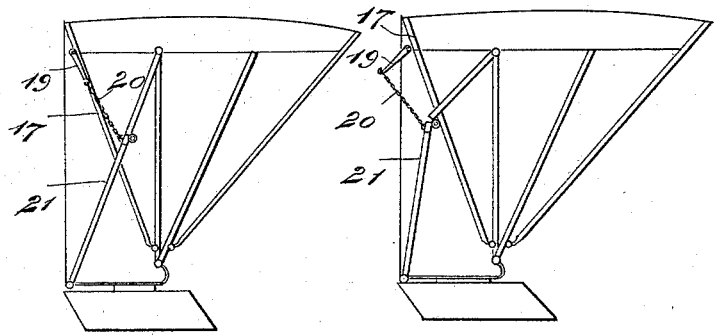
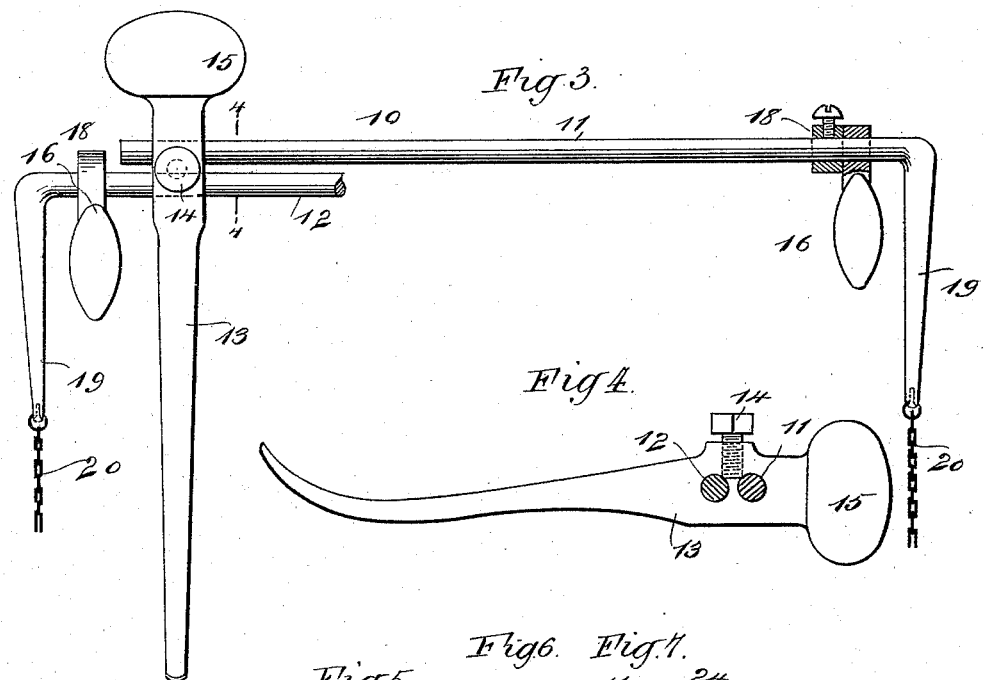
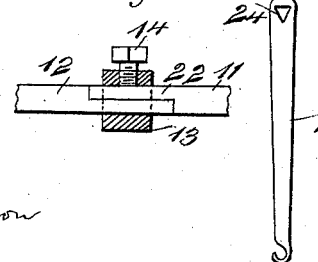
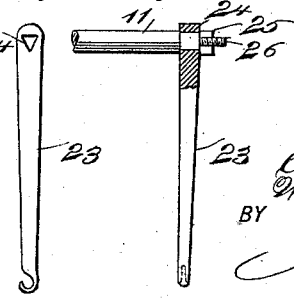
WITNESSES:
Paul Johal
W. B. Hutchinson
INVENTORS
A. C. Bendler
W. E. Bendler
BY
Munn & Co
ATTORNEYS.

UNITED STATES PATENT OFFICE.

AUGUST C. BENDLER, OF MILWAUKEE, WISCONSIN, AND WILLIAM E. BENDLER, OF CHICAGO, ILLINOIS.

CARRIAGE-TOP WORKER.

SPECIFICATION forming part of Letters Patent No. 527,314, dated October 9, 1894.

Application filed May 29, 1894. Serial No. 512,851. (No model.)

*To all whom it may concern:*

Be it known that we, AUGUST C. BENDLER, of Milwaukee, in the county of Milwaukee and State of Wisconsin, and WILLIAM E. BENDLER, of Chicago, in the county of Cook and State of Illinois, have invented a new and Improved Carriage-Top Worker, of which the following is a full, clear, and exact description.

Our invention relates to improvements in that class of devices which are adapted for use in working buggy tops or similar tops, so that they may be folded back from the inside of the carriage; and the object of our invention is to produce an extremely simple, strong and durable device of this character, which may be easily applied to any ordinary carriage top, and which, when applied, enables the said top to be conveniently worked from within the carriage.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of a carriage top provided with our improved attachment, the top being shown in a raised position. Fig. 2 is a similar view, but showing the worker moved to bend the braces of the carriage top and permit the latter to fold back. Fig. 3 is an enlarged detail view, partly in section, of the apparatus embodying our invention. Fig. 4 is a cross section on the line 4—4 of Fig. 3. Fig. 5 is a detail sectional view, showing a modified means of connecting the two portions of the crank shaft. Fig. 6 is a detail view of a modified form of the crank arm to connect with the carriage brace; and Fig. 7 is a broken detail view, partly in section, showing the application of the crank arm shown in Fig. 6 to the crank shaft.

The device embodying our invention is provided with a crank shaft 10, which is preferably made up of two parts 11 and 12 to facilitate its attachment to and adjustment on the vehicle, and these two sections of the crank shaft are coupled together by means of the handle lever 13, through which both sections of the shaft project, as shown in Figs. 3 and 4, and both sections are bound in place by a single set screw 14 which enters the handle and impinges on the shaft sections. The handle 13 is adapted to lie normally in a horizontal position, and to keep it so it is provided at its rear end with a counterbalancing weight 15, or a spring may be substituted for the weight.

The crank shaft 10 is supported in brackets 16 which are applied to the back bow 17 or other convenient part of the upper portion of the carriage top, as shown in Figs. 1 and 2, and collars 18 are secured to the shaft next the brackets to prevent the shaft from shifting endwise. The crank shaft has at opposite ends crank arms 19 which are preferably formed by bending the shaft at right angles, as shown in Fig. 3, and to the ends of these arms are secured chains 20 which connect with the jointed braces 21 of the carriage top, the connection being by means of a clip, eye bolt, or any suitable means, and it will be seen that by grasping the handle 13 and turning it down the crank shaft 10 is tilted so as to throw back the crank arms 19 and pull the chains 20 and braces 21 back also, thus putting the top in position to fold back.

Instead of coupling the shaft sections together, as described, their ends may be made to overlap, as shown at 22 in Fig. 5, and the handle 13 slipped over the joint, while the set screw 14 pulls the handle in place and thus effects a secure coupling. Instead of the integral arms 19, detachable crank arms 23, see Figs. 6 and 7, may be used, in which case each arm is provided with a flat sided hole 24 at one end to fit on a similarly shaped portion at the end of the crank shaft 11, and the crank arm is held in place by a nut 25 fitting a reduced and threaded portion 26 of the shaft.

Having thus described our invention, we claim as new and desire to secure by Letters Patent—

1. The combination, with the carriage top, of the longitudinally extensible crank shaft journaled thereon, a handle for the crank shaft, and an operative connection between the cranks of the shaft and the braces of the carriage top, substantially as described.

2. The combination, with the carriage top, of the two-part crank shaft thereon, a handle forming the coupling which connects the two sections of the shaft, and an operative connection between the cranks of the shaft and the braces of the carriage top, substantially as described.

3. The combination, with the carriage top, of the two-part crank-shaft journaled thereon, the counterbalanced handle forming the coupling between the two shaft sections, cranks on the ends of the shaft, and a connection between the cranks and the braces of the carriage top, substantially as described.

AUGUST C. BENDLER.
WILLIAM E. BENDLER.

Witnesses to the signature of August C. Bendler:
  JOHN C. KLEIST,
  H. C. ESCHWEILER.

Witnesses to the signature of William E. Bendler:
  A. G. HINTZ,
  CAROLINA CONRAD.